United States Patent
Gehrke et al.

(10) Patent No.: US 7,908,858 B2
(45) Date of Patent: Mar. 22, 2011

(54) SYSTEM THAT LIMITS TURBO SPEED BY CONTROLLING FUELING

(75) Inventors: Christopher Ronald Gehrke, Chillicothe, IL (US); James Harris Mutti, Jr., Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 383 days.

(21) Appl. No.: 11/882,238

(22) Filed: Jul. 31, 2007

(65) Prior Publication Data

US 2009/0031723 A1    Feb. 5, 2009

(51) Int. Cl.
F02D 23/00 (2006.01)
G06F 19/00 (2006.01)
F02M 51/00 (2006.01)
F02M 7/00 (2006.01)

(52) U.S. Cl. ............ 60/601; 60/602; 701/115; 123/486; 123/435

(58) Field of Classification Search ............ 60/600–603; 123/486, 435, 479–480; 701/102, 115
See application file for complete search history.

(56) References Cited

U.S. PATENT DOCUMENTS

| | | | | |
|---|---|---|---|---|
| 4,697,421 A * | 10/1987 | Otobe et al. | .................... | 60/602 |
| 4,719,887 A | 1/1988 | Schmid et al. | .................. | 60/602 |
| 5,850,738 A * | 12/1998 | Hayashi | ........................... | 60/602 |
| 6,067,800 A | 5/2000 | Kolmanovsky et al. | ........ | 60/602 |
| 6,095,127 A * | 8/2000 | Kolmanovsky et al. | ...... | 123/480 |
| 6,151,549 A * | 11/2000 | Andrews et al. | ............. | 701/115 |
| 6,155,050 A * | 12/2000 | Blanz et al. | ..................... | 60/603 |
| 6,192,867 B1 | 2/2001 | Fenchel et al. | .................. | 60/603 |
| 6,256,992 B1 | 7/2001 | Lewis et al. | ..................... | 60/603 |
| 6,401,457 B1 | 6/2002 | Wang et al. | ..................... | 60/602 |
| 6,408,624 B1 | 6/2002 | Books et al. | ..................... | 60/601 |
| 6,460,514 B1 * | 10/2002 | Imai et al. | ..................... | 123/479 |
| 6,581,382 B2 | 6/2003 | Weber et al. | .................... | 60/602 |
| 6,619,261 B1 * | 9/2003 | Wang et al. | .................... | 123/435 |
| 6,725,659 B1 | 4/2004 | Shao et al. | ....................... | 60/601 |
| 6,725,660 B2 | 4/2004 | Hidaka | ............................ | 60/602 |
| 6,850,833 B1 * | 2/2005 | Wang et al. | ..................... | 60/602 |
| 6,907,733 B2 | 6/2005 | Nishiyama et al. | ............. | 60/602 |
| 7,069,171 B2 * | 6/2006 | Wang et al. | ................... | 702/145 |
| 7,509,803 B2 * | 3/2009 | Panciroli | ....................... | 60/600 |
| 2005/0050878 A1 * | 3/2005 | Wang et al. | ..................... | 60/277 |
| 2006/0201151 A1 | 9/2006 | Olsson et al. | ................... | 60/602 |
| 2007/0044471 A1 | 3/2007 | Cochet et al. | .................. | 60/602 |
| 2008/0271452 A1 * | 11/2008 | Reynolds et al. | .............. | 60/611 |
| 2009/0048745 A1 * | 2/2009 | Wu et al. | .......................... | 701/51 |
| 2009/0055072 A1 * | 2/2009 | He et al. | .......................... | 60/602 |
| 2009/0198432 A1 * | 8/2009 | Tabata et al. | .................. | 701/103 |

FOREIGN PATENT DOCUMENTS

| EP | 0 208 248 B1 | 5/1989 |
|---|---|---|
| EP | 1 674 668 A2 | 6/2006 |
| WO | 2008/018380 | 2/2008 |

* cited by examiner

Primary Examiner — Thai Ba Trieu
(74) Attorney, Agent, or Firm — Finnegan, Henderson, Farabow, Garrett & Dunner LLP

(57) ABSTRACT

A turbocharger control system is disclosed. The control system may have an engine and a fuel system configured to regulate fuel flow into the engine. The control system may further have an air induction system configured to regulate air flow into the engine and a sensor situated to sense a speed value of the air induction system. The controller may also have a controller configured to receive the speed value and regulate fuel flow into the engine as a function of the speed value.

19 Claims, 3 Drawing Sheets

SYSTEM THAT LIMITS TURBO SPEED BY CONTROLLING FUELING

TECHNICAL FIELD

The present disclosure relates generally to a control system and, more particularly, to a control system that limits the speed of a turbocharger by controlling the rate of fuel flowing into an associated engine.

BACKGROUND

Internal combustion engines such as, for example, diesel engines, gasoline engines, and gaseous fuel powered engines, combust a mixture of air and fuel to produce power. The amount of air and fuel, and the ratio of air-to-fuel introduced into a combustion chamber of the engine can affect power output, efficiency, and exhaust emissions of the engine. Typically, the amount of air introduced into the engine and the ratio of air-to-fuel is controlled by a number of different fluid handling components located in both the air induction and exhaust systems of the engine.

An engine often includes a turbocharger to increase a power density of the engine. A turbocharger includes a turbine, driven by exhaust of the engine, to rotate a compressor and pressurize air directed into the engine. Depending on an internal geometry setting of the turbine and/or compressor, more or less air will be compressed to a higher or lower pressure for a given rotation. A variable geometry turbocharger (VGT), often used with diesel engines, is capable of altering the direction of exhaust flow to optimize turbine response. A VGT includes adjustable vanes within the turbine to adjustably direct exhaust flow radially inward toward turbine blades. It is common for a control system to command an actuator to change the angle of the vanes to optimize operation of the turbine. Changing the angle of air flow increases or decreases the speed of the turbocharger with a given amount of exhaust flow. Although this system can be successfully implemented, failure of the turbocharger due to excessive turbo speed my occur when the actuator is slow to adjust the movable vanes into a position that will decrease turbocharger speed. Hence, turbocharger failure may be caused by excessive energy passing through the turbocharger in response to a slow reaction by the actuator.

One attempt to minimize the likelihood of turbocharger failure has been described in U.S. Pat. No. 6,192,867 (the '867 patent) to Fenchel et al. The '867 patent describes a method and device for protecting a turbo-supercharger by determining a limit value for the fuel quantity metered to the engine from an intake air pressure, as derived from a program map. Determination of the intake air pressure does not require a sensor, because it is derived from a program map based on a function of charging pressures, engine speed, and a fuel quantity preset corresponding to an accelerator position. Reducing the fuel quantity decreases the overall energy in the exhaust conduit prevailing on the turbine of the turbocharger. As a result, the '867 patent is able to prevent the turbocharger from reaching a critical turbocharger speed.

Although the '867 patent may help reduce the likelihood of turbocharger failure due to excessive turbine speed, it may be overly complex and limited. The '867 patent is complex because the intake air pressure must be determined based on numerous input values. That is, it may be possible for the air pressure to be low and yet turbo speeds to be excessive. The '867 patent's derivation of intake air pressure may not accurately correspond to the actual speed of the turbocharger. The '867 patent is limited because it does not consider the effects of turbocharger failure when using a variable geometry turbocharger that includes an exhaust flow control device. That is, the '867 may be inapplicable to a turbocharger including a VGT.

The disclosed control system is directed to overcoming one or more of the problems set forth above.

SUMMARY OF THE INVENTION

In one aspect, the present disclosure is directed to a turbocharger control system. The control system may include an engine and a fuel system configured to regulate fuel flow into the engine. The control system may further include an air induction system configured to regulate air flow into the engine, and a sensor situated to sense a speed value of the air induction system. The controller may also include a controller configured to receive the speed value and regulate fuel flow into the engine as a function of the speed value.

In another aspect, the present disclosure is directed to a method of limiting turbo speed. The method may include sensing a turbo speed value. The method may further include comparing the turbo speed value to a turbo speed limit value. The method may also include regulating fuel flow into an engine based on the comparison.

DETAILED DESCRIPTION

Figure 1:
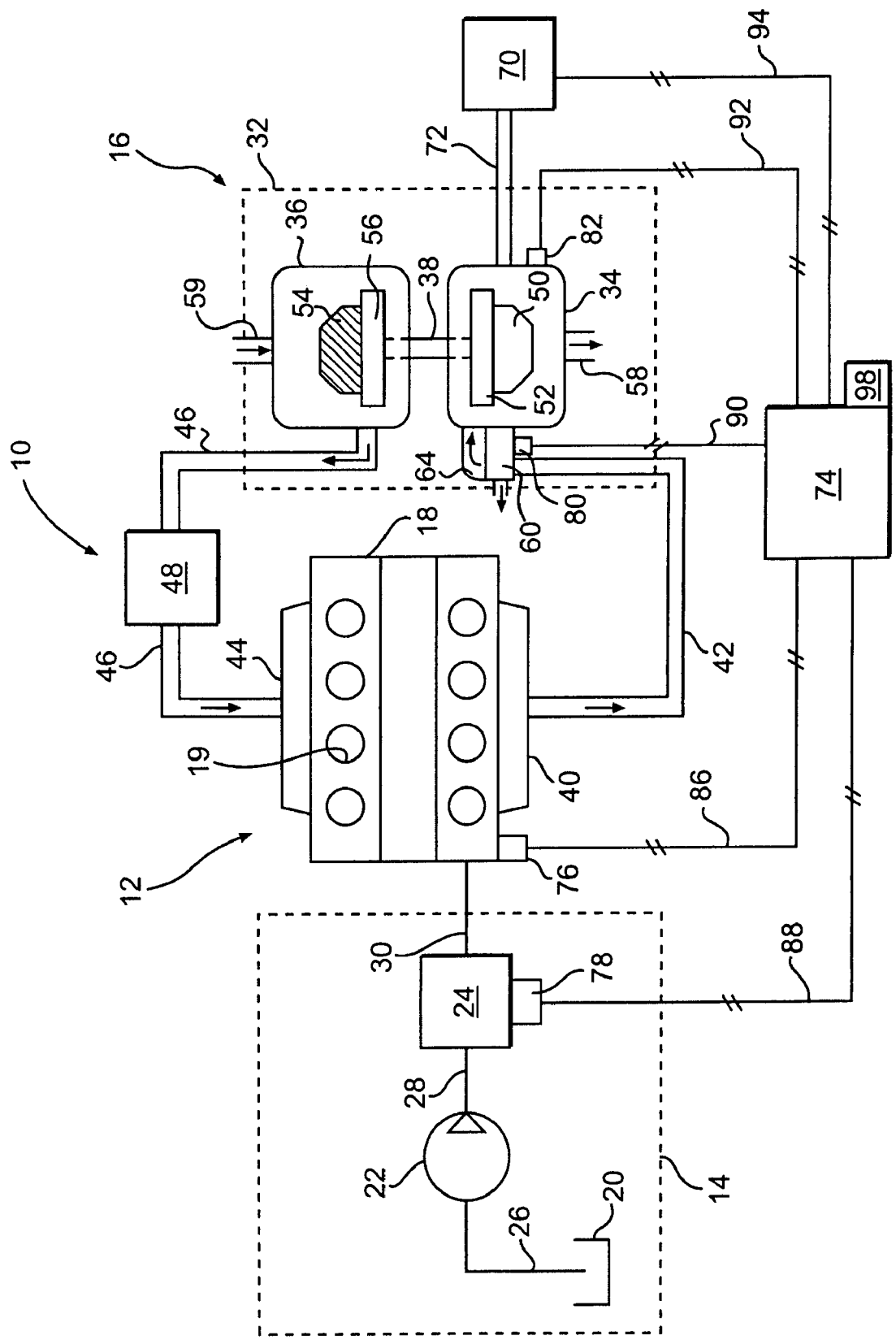
FIG. 1 is a schematic illustration of an exemplary disclosed control system.

FIG. 1 illustrates a control system 10 for limiting turbo speed by controlling engine fuel. Control system 10 may control operation of a power source 12, a fuel system 14, and an air induction system 16. Power source 12 may embody an engine having multiple components that cooperate to combust a fuel/air mixture and produce a power output. For example, power source 12 may be a diesel engine, a gasoline engine, or a gaseous fuel-powered engine having an engine block 18 that at least partially defines a plurality of cylinders 19, a piston (not shown) slidably disposed within each cylinder, and a cylinder head associated with each cylinder 19. The cylinder 19, piston, and cylinder head may form a combustion chamber (not shown). Power source 12 may draw the fuel/air mixture into each cylinder 19, compress the mixture with the piston, and ignite the mixture to produce a combination of power, heat, and exhaust. The heated exhaust may be used to pressurize air induction system 16.

Fuel system 14 may include a fuel tank 20, a fuel pump 22, and a fuel regulator 24. Fuel tank 20 may hold a supply of fuel. Fuel may be drawn from fuel tank 20 by fuel pump 22 via a fuel line 26. After exiting fuel pump 22, fuel may be discharged to fuel regulator 24 via a fuel line 28. Fuel regulator 24 may regulate the amount of fuel permitted to enter power source 12 via fuel line 30.

Fuel pump 22 may be any type of pump capable of imparting fuel flow from fuel tank 20 through fuel system 14. For example, fuel pump 22 may be a fixed displacement/variable delivery pump, a variable displacement pump, or a fixed delivery pump. Fuel pump 22 may be operably connected to and mechanically driven by power source 12. Alternatively, fuel pump 22 may be driven electronically, hydraulically, pneumatically, or in any other known manner.

Fuel regulator 24 may control fuel flow entering power source 12 and, more specifically may control fuel flow into each combustion chamber of power source 12. As shown in FIG. 1, fuel regulator may embody a valve located outside engine block 18. Alternatively, fuel regulator 24 may embody a fuel injector system (not shown) including fuel injectors that may be disposed within engine block 18 to inject a regulated amount of pressurized fuel into each cylinder. It is contemplated that fuel regulator 24 may be operated hydraulically, mechanically, electrically, pneumatically, or in any other known manner.

Air induction system 16 may increase the power output of power source 12 by compressing air flowing into power source 12 with a turbocharger 32. Turbocharger 32 may include a turbine 34 mechanically connected on a shared axis to a compressor 36 via a shaft 38. Turbocharger 32 may include a bearing housing including a bearing (not shown) for supporting shaft 38 and improving efficiency and reducing wear of turbocharger 32. It is contemplated that the bearing may be a rotary bearing and more specifically, a fluid bearing. Alternatively, the bearing may be any type of bearing sufficient to reduce wear of turbocharger 32.

Power source 12 may include an exhaust manifold 40 used to direct exhaust flow from cylinders 19 of engine block 18 following combustion of the air/fuel mixture. Turbine 34 may be connected to exhaust manifold 40 by an exhaust line 42. Compressor 36 may be connected to an air inlet manifold 44 of power source 12 via an air inlet line 46. It is contemplated that an air cooler 48 may be inserted between compressor 36 and air inlet manifold 44 to cool the pressurized air before the air enters power source 12, if desired.

Turbine 34 may include a plurality of turbine blades 50 (shown in FIGS. 2 and 3) mounted to a turbine wheel 52. Turbine wheel 52 may be connected to shaft 38. As exhaust flows from exhaust manifold 40 into turbine 34, exhaust flow my cause turbine blades 50 to spin shaft 38 and thereby drive compressor 36. Exhaust flow may exit turbine 34 via an exhaust exit port 58.

The amount of exhaust flow passing through turbine 34 may affect the speed of the compressor 36. For example, an increase in exhaust flow and/or exhaust heat from power source 12 may cause turbine blades 50 to spin shaft 38 and drive compressor 36 at a higher rotational speed. Likewise, a reduction in exhaust flow and/or exhaust heat from power source 12 may cause turbine blades 50 to spin shaft 38 and drive compressor at a slower rotational speed.

Compressor 36 may include a plurality of compressor blades 54 mounted to a compressor wheel 56. Compressor wheel 56 may be connected to shaft 38. Rotational force from turbine 34 may be transferred to compressor 36 via shaft 38 and thereby spin compressor blades 54 to pressurize ambient air that may enter compressor 36 via an ambient air inlet port 59. Therefore, rotation of compressor blades 54 within compressor 36 may pressurize ambient air entering power source 12.

Figure 3:
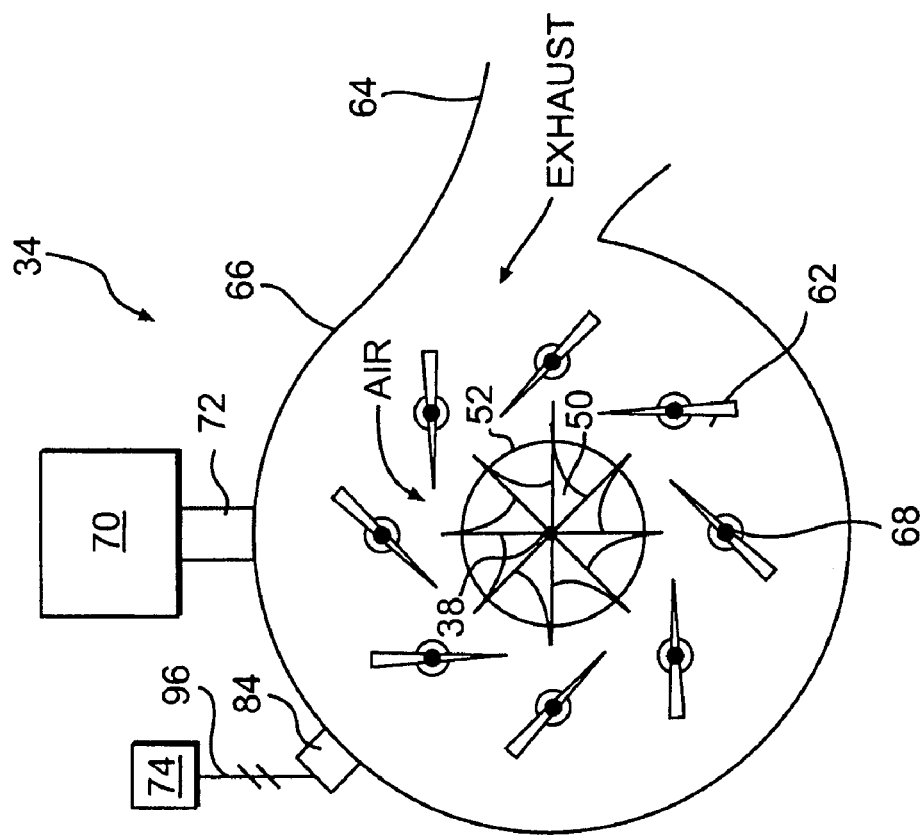
FIG. 3 is a schematic illustration of a variable geometry turbocharger with vanes in a substantially open position for use with the control system of FIG. 1.
Figure 2:
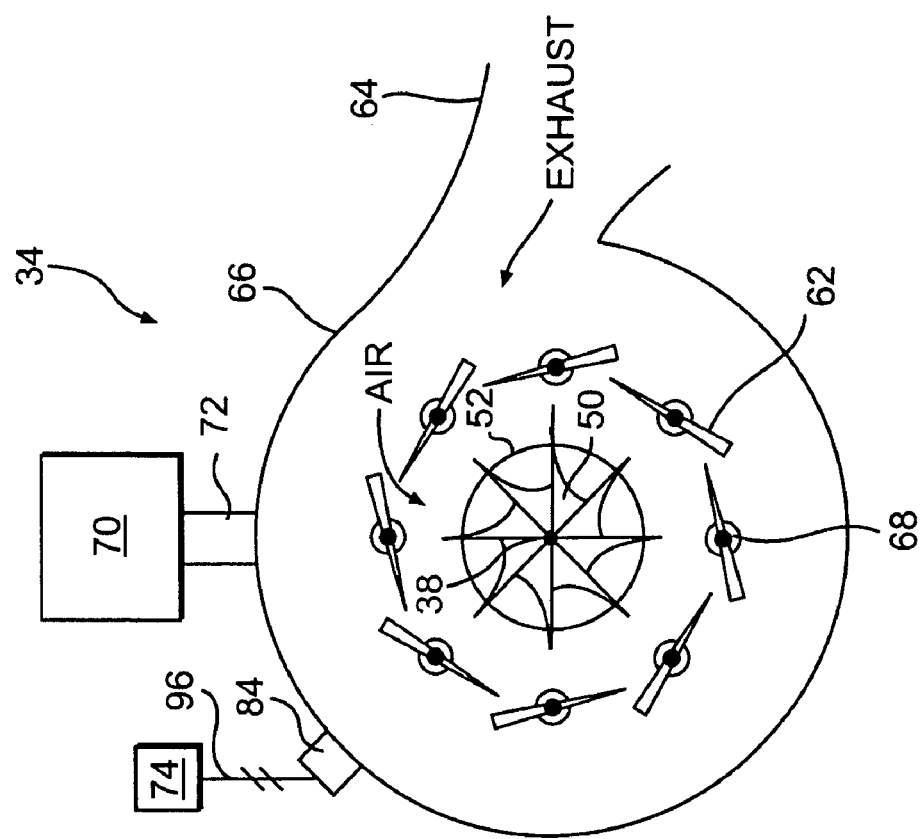
FIG. 2 is a schematic illustration of a variable geometry turbocharger with vanes in a substantially closed position for use with the control system of FIG. 1.

Air induction system 16 may include at least one exhaust flow control device for altering exhaust flow, for example, a wastegate 60 and/or one or more adjustable vanes 62 (shown in FIGS. 2 and 3). The exhaust flow control devices, either used individually or in combination, may control the speed of turbocharger 32 by regulating the amount or the angle of exhaust flow from power source 12 into turbine 34. Turbo speed may be defined as the rotational speed of turbocharger 32, and more specifically, the speed of rotational components (e.g., shaft 38, turbine wheel 52, and compressor wheel 56) within turbocharger 32.

Wastegate 60 may include a valve (not shown) located near an exhaust inlet port 64 of turbine 34 that regulates turbo speed by selectively directing excessive exhaust flow to bypass turbine blades 50. Wastegate 60 may include an open position, at which the wastegate valve is fully open and exhaust flow is free to bypass turbine 34 and thereby may decrease the speed of turbocharger 32. Wastegate 60 may also include a closed position, at which the wastegate valve is fully closed and exhaust flow is free to enter turbine 34 and thereby may increase the speed of turbocharger 32. It is contemplated that the wastegate valve may adjust to various positions between the open and closed positions to precisely control exhaust flow in or around turbine 34 to thereby target a desired speed and/or intake air pressure. Wastegate 60 may include any known valve capable of regulating exhaust flow in or around turbine 34. For example, wastegate 60 may include a butterfly or flapper-type valve. Alternatively or in addition to using wastegate 60, turbine 34 may include one or more adjustable vanes 62 to control turbo speed and/or the intake air pressure (i.e., turbocharger 32 may be a variable geometry turbine (VGT)).

FIGS. 2 and 3 illustrate a VGT with adjustable vanes 62 in a substantially closed position and a substantially open position, respectively. A VGT may control turbo speed and intake air pressure by adjusting vanes 62 to alter exhaust flow within housing 66 toward or around turbine blades 50 to vary a force of impact on turbine blades 50. It is contemplated that the configuration of vanes 62 may be adjusted by any known manner to control exhaust flow through turbine 34. Each adjustable vane 62 may be pivoted about an axis 68 by an actuator 70 to alter exhaust flow within turbine 34. For example, at low engine speeds, actuator 70 may cause vanes 62 to be partially closed (shown in FIG. 2), which may accelerate exhaust flow toward the turbine blades 50 and thereby cause turbine 34 to spin faster and compressor 36 to compress more air to a higher level. Alternatively, at high engine speeds, exhaust flow may already be sufficiently strong. Therefore, actuator 70 may open vanes 62 (shown in FIG. 2) to reduce the relative exhaust flow force on turbine blades 50.

Actuator 70 may adjust the position of vanes 62. Actuator 70 may be a hydraulic actuator. For example, actuator 70 may be connected to turbine 34 by a hydraulic line 72. Alternatively, actuator 70 may be an electrical, pneumatic, or any other known actuator capable of controlling the position of vanes 62. It is contemplated that actuator 70 may also actuate wastegate 60 or that an additional actuator may control operation of wastegate 60.

Control system 10 may regulate operation of power source 12, fuel system 14, and air induction system 16 using a controller 74. Controller 74 may communicate with a speed sensor 76 associated with power source 12 to monitor a speed of power source 12 via a communication line 86. Controller 74 may further communicate with a flow sensor 78 associated with fuel system 14 to monitor and regulate fuel flow via a communication line 88. Controller 74 may also communicate with a position sensor 80 associated with wastegate 60 to monitor and control movement of the position of the wastegate valve via a communication line 90. Additionally, controller 74 may communicate with a speed sensor 82 associated with a turbocharger 32 to monitor speed of turbocharger 32 via a communication line 92. Controller 74 may further communicate with actuator 70 to control movement of vanes 62 via a communication line 94. It is contemplated that turbine 34 may include a position sensor 84 (shown in FIGS. 2 and 3) to communicate the position of vanes 62 to controller 74 via a communication line 96. Further, it is contemplated that an intake air pressure sensor (not shown) may be implemented, if desired.

Controller 74 may embody a single microprocessor or multiple microprocessors. It is contemplated that controller 74 could be a general power source processor capable of controlling numerous power source functions. Controller may include all of the components (not shown) required to run an application such as, for example, a memory device, a secondary storage device, and a processor. Controller 74 may transmit and receive communication from various sensors and power source devices, for example, sensors 76, 78, 80, 82, and 84. Controller 74 may analyze communications received from the various sensors and power source devices using stored instructions to determine whether action is required. For example, controller 74 may receive turbo speed data from turbo speed sensor 82 and compare the turbo speed data to a turbo speed limit stored in the memory device of controller 74, and, based on the results of the comparison, controller 74 may transmit signals to one ore more components to cause adjustments thereto.

Controller 74 may access stored data for operation of power source 12, fuel system 14, and air induction system 16 from lookup tables 98 stored in memory. For example, controller 74 may access a first lookup table to store a turbo speed limit value and a second lookup table to store an engine derate value. While it may be possible for controller 74 to perform calculations for a turbo speed limit value and an engine derate value, it may be faster and more efficient for controller to access the values from lookup tables stored in memory.

Sensors 76, 78, 80, 82 and 84 may be any known sensor capable of sensing operating conditions of power source 12, fuel system 14, or air induction system 16. For example, speed sensor 76 may be an engine speed sensor located in or near engine block 18 to monitor a rotational speed of an associated crankshaft. Flow sensor 78, may be a fuel flow sensor located in or near the fuel system 14 to monitor a flow rate of fuel being sprayed into the combustion chambers of power source 12. Position sensor 80 may detect a position of a valve within wastegate 60. Speed sensor 82 may be a rotational speed sensor located in or near turbine 34 to measure the speed of turbine blades 50, compressor blades 54, and shaft 38. More specifically, speed sensor 82 may be located in or near a bearing housing (not shown) of turbine 34. Position sensor 84 may be an angle sensor located in or near turbine housing 66 to detect a position of vanes 62.

Controller 74 may regulate operation of wastegate 60 and vanes 62 based on air pressure. Hence, as intake air pressure changes, controller 74 may continuously regulate operation of wastegate 60 and vanes 62. Controller 74 may limit fuel flow based on sensed turbo speed. Hence, when sensed turbo speed exceeds a predetermined turbo speed limit, controller 74 may periodically limit fuel flow until the sensed turbo speed drops below the turbo speed limit.

Figure 4:
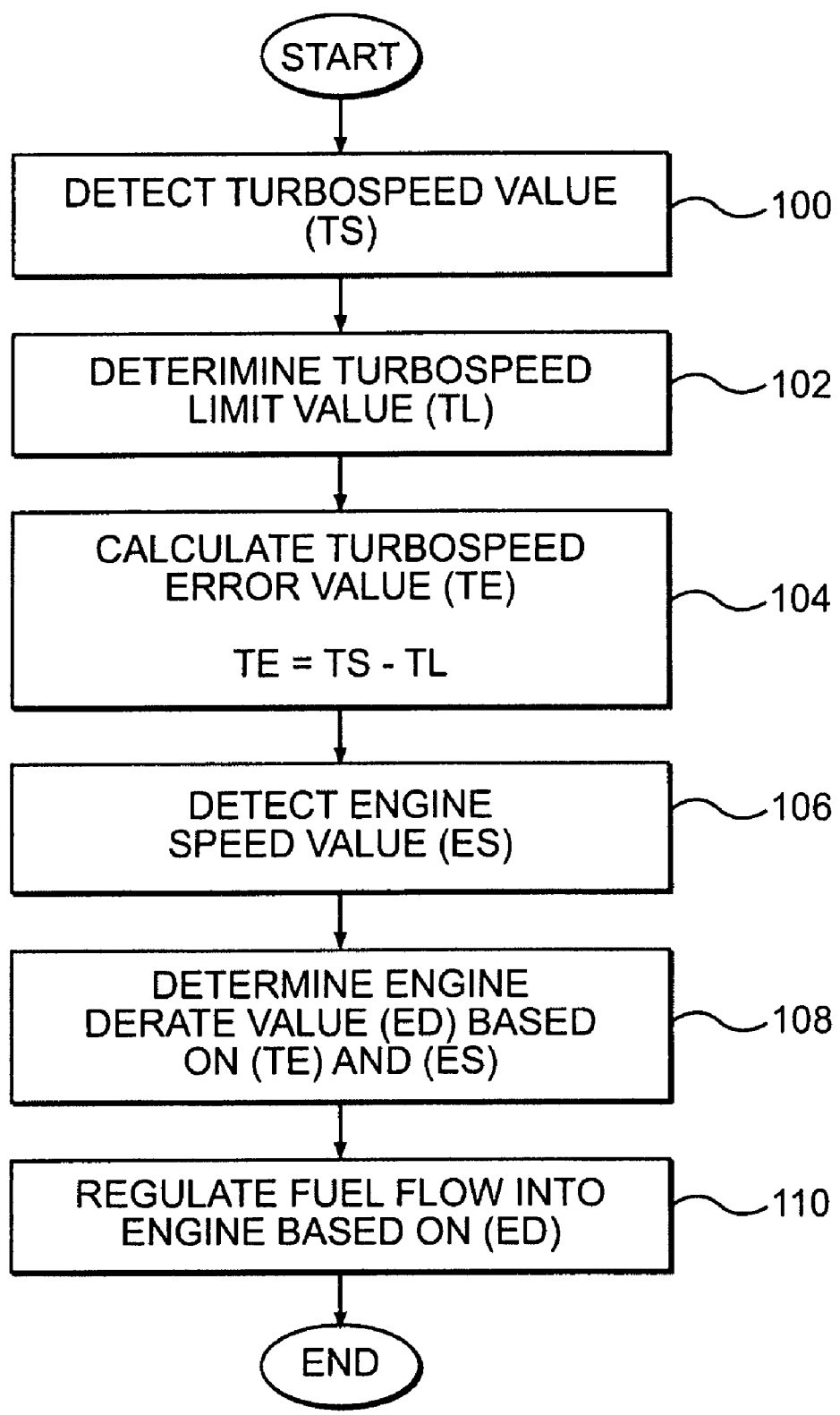
FIG. 4 is a flow diagram illustrating a method of limiting turbo speed by controlling engine fuel.

FIG. 4 shows a flow-diagram illustrating a method of limiting turbo speed. FIG. 4 will be discussed in detail in the following section.

INDUSTRIAL APPLICABILITY

The disclosed control system may be used in any system where excessive turbo speed is a concern. The disclosed control system may regulate turbo speed and air intake pressure continuously and then limit excessive turbospeed to prevent turbocharger failure. Operation of control system 10 will now be described.

Turbo speed and/or intake air pressure are typically regulated by bypassing exhaust flow around turbine 34 via a wastegate 60 or by adjusting the angle of exhaust flow within turbine 34. When it is desirable to regulate turbo speed, wastegate 60 may adjust the amount of exhaust flow into or bypassing turbine 34 via the wastegate valve. For example, when turbocharger 32 experiences high turbo speed, controller 74 may bypass at least a portion of the exhaust flow around turbine 34 via wastegate 60. When it is desired to increase turbo speed, the wastegate valve may be positioned to allow a greater amount of exhaust flow to enter turbine 34. Optionally or in addition to wastegate control, vane control may also be used to regulate turbo speed and/or intake air pressure. Controller 74 may signal actuator 70 to adjust the position of vanes 62 and thereby adjust the angle of exhaust flow within turbine 34. More specifically, actuator 70 may pivot vanes 62 from a first position to a second position to regulate the angle and force of exhaust flow that may impact turbine blades 50.

A problem may arise that limits the reaction time of actuator 70 and/or wastegate 60. For example, actuator 70 may not react with sufficient speed to adjust vanes 62 to prevent or reduce excessive exhaust flow from causing turbo speed to reach or exceed a predetermined turbo speed limit. More specifically, hydraulic actuators may be prone to sticking or slow movement, especially at low oil temperatures. Sudden changes in engine speed and engine load (i.e., downshifts) may outpace the reaction time of actuator 70. Therefore, in addition to regulating turbo speed via exhaust flow control, it may be desirable to limit turbo speed via fuel flow control. Engine speed may be regulated by controlling a rate of fuel flow into power source 12. It is contemplated that under certain adverse conditions, for example, low oil temperatures, high altitude, or sudden changes in engine speed or engine load, turbo speed may be controlled by regulating fuel flow as an alternative to managing a bypass or an angle of exhaust flow. More specifically, regulating fuel to limit turbo speed may be desirable when operation of an exhaust flow control device or an associated actuator 70 is insufficient to maintain the speed of turbocharger 32 below a predetermined speed limit.

With regard to FIG. 4, speed sensor 82 may detect a turbo speed value (TS) of turbocharger 32 and transmit the turbo speed value to controller 74 via communication line 92 (step 100). In response to receiving the turbo speed value, controller 74 may be instructed to access a turbo speed limit value (TL) from a first stored look-up table (step 102). Controller 74 may calculate a turbo speed error value (TE) by subtracting the turbo speed limit value from the sensed turbo speed value (step 104). Speed sensor 76 may detect an engine speed value (ES) of power source 12 and transmit the engine speed value to controller 74 via communication line 86 (step 106). Controller 74 may utilize the calculated turbo speed error value and the sensed engine speed value to access an engine derate value (ED) from a second stored look-up table (step 108). More specifically, the engine derate value may be expressed as a percent initialized to zero and determined from a map look-up, whereby engine derate may be increased or decreased. For example, the engine derate value may increase if the turbo speed error value is positive and the engine derate value may decrease if the turbo speed error value is negative, whereby the engine derate value may be applied by summing the increases and decreases in the turbo speed error values over time. Hence, as the turbo speed error value remains positive, the engine derate value may continue to increase, and when the turbo speed error rate is negative, the engine derate value may decrease until it reaches zero. Controller 74 may determine a change in fuel flow into power source 12 based on the engine derate value. Controller 74 may send a signal to fuel regulator 24 via communication line 88 to limit the amount of fuel flow from fuel system 14 into power source 12 and thereby limit engine speed (step 110).

Exhaust flow control, by wastegate and/or vane operation, may be continuously implemented as needed to selectively regulate turbo speed and/or intake air pressure. However, when exhaust flow control is insufficient to maintain a sensed turbo speed below a predetermined limit, then fuel flow regulation may be implemented in addition to or as an alternative to exhaust flow control. Hence, fuel flow control and exhaust flow control may be simultaneously or separately implemented to limit excessive turbo speed when the turbo speed value exceeds the turbo speed limit value. Once the sensed turbo speed is below the predetermined turbo speed limit, fuel flow regulation may cease until the sensed turbo speed again exceeds the predetermined turbo speed limit.

Because control system 10 may derate power source operation via engine fuel limiting, in addition to or as an alternative to exhaust flow control, responsiveness may be improved. Improvement may be particularly noticeable at low oil temperatures, high altitude, or during sudden engine speed or load changes. Engine speed or load changes can more quickly change turbine operation, as compared to merely implementing exhaust flow control.

It will be apparent to those skilled in the art that various modifications and variations can be made to the disclosed control system without departing from the scope of the disclosure. Other embodiments of the control system will be apparent to those skilled in the art from consideration of the specification and practice of the control system disclosed herein. It is intended that the specification and examples be considered as exemplary only, with a true scope of the disclosure being indicated by the following claims and their equivalents.

What is claimed is:

1. A method of limiting turbo speed, comprising:
   sensing a turbo speed value;
   comparing the turbo speed value to a turbo speed limit value; and
   simultaneously regulating an exhaust flow of an engine and limiting fuel flow into the engine when the comparison indicates a condition associated with turbo overspeed.

2. The method of claim 1, wherein the turbo speed limit value is determined from a look-up table.

3. The method of claim 1, wherein regulating exhaust flow includes adjusting the position of vanes within a variable geometry turbocharger.

4. The method of claim 1, wherein fuel flow is only limited when regulating exhaust flow alone is insufficient to maintain the turbo speed value below the turbo speed limit value.

5. The method of claim 4, wherein regulating fuel flow further includes ceasing to limit fuel flow when regulating fuel flow alone is sufficient to maintain the turbo speed value below the turbo speed limit value.

6. The method of claim 1, wherein regulating exhaust flow is performed continuously during operation of the engine.

7. The method of claim 1, further including sensing an engine speed and determining an engine derate value as function of the engine speed and the turbo speed value.

8. The method of claim 7, wherein regulating fuel flow includes limiting fuel flow into the engine as a function of the engine derate value.

9. The method of claim 1, wherein limiting fuel flow includes limiting fuel flow regardless of a capacity for additional exhaust flow regulation.

10. A turbocharger control system, comprising:
    an engine;
    a fuel system configured to regulate fuel flow into the engine;
    an air induction system configured to regulate air flow into the engine;
    a sensor situated to sense a speed value of the air induction system;
    a turbocharger associated with the air induction system and including:
      a turbine;
      a compressor driven by the turbine; and
      an exhaust flow control device operable to alter an exhaust flow of the engine to affect the speed value; and
    a controller configured to receive the speed value, and simultaneously limit fuel flow into the engine and alter operation of the exhaust flow control device as a function of the speed value to reduce an overspeed condition, and to limit the fuel flow into the engine regardless of an actuation condition of the exhaust flow control device.

11. The control system of claim 10, wherein the speed value is a turbocharger speed.

12. The control system of claim 11, wherein the turbocharger is a variable geometry turbocharger and the exhaust flow control device includes vanes of the variable geometry turbocharger.

13. The control system of claim 11, wherein the controller is configured to limit fuel flow when operation of the exhaust flow control device alone is insufficient to maintain the speed value below a speed limit value.

14. The control system of claim 13, wherein the controller is further configured to cease limiting fuel flow when operation of the exhaust flow control device alone is sufficient to maintain the speed value below the speed limit value.

15. The control system of claim 11, wherein the exhaust flow control device is configured to continuously operate during operation of the engine.

16. The control system of claim 1, further including a sensor associated with the engine to determine a speed of the engine, wherein the controller is further configured to receive the speed of the engine and determine an engine derate value as a function of the speed value of the air induction system and the speed of the engine.

17. The control system of claim 16, wherein the controller is configured to limit fuel flow as a function of the engine derate value.

18. A turbocharger control system, comprising:
    an engine;
    a fuel system configured to regulate fuel flow into the engine;
    an air induction system configured to regulate air flow into the engine;
    a sensor situated to sense a speed value of the air induction system;
    a turbocharger associated with the air induction system and including a turbine and a compressor driven by the turbine;
    a wastegate; and
    a controller configured to receive the speed value, and simultaneously limit fuel flow into the engine and alter operation of the wastegate as a function of the speed value to reduce an overspeed condition, and to limit the fuel flow into the engine regardless of an actuation condition of the wastegate.

19. A power system comprising:
an engine;
a fuel regulator;
a turbocharger configured to pressurize air directed into the engine, the turbocharger having a turbine, a compressor driven by the turbine, and an exhaust flow control device operable to affect a speed of the turbocharger;
a turbo speed sensor configured to sense a turbo speed value of the turbocharger;
an engine speed sensor configured to sense an engine speed value; and
a controller configured to receive the turbo speed value and the engine speed value, to simultaneously limit fuel flow through the fuel regulator and adjust operation of the exhaust flow control device as a function of the engine speed value when the turbo speed value is indicative of an overspeed condition, and to limit fuel flow through the fuel regulator regardless of an operational condition of the exhaust flow control device.

* * * * *